Sept. 11, 1934.　　　V. C. DE YBARRONDO　　　1,973,400
TALKING MOTION PICTURE APPARATUS
Filed April 7, 1930　　　2 Sheets-Sheet 1

INVENTOR:
VINCENT C. DE YBARRONDO,
BY

ATTORNEY.

Sept. 11, 1934.  V. C. DE YBARRONDO  1,973,400
TALKING MOTION PICTURE APPARATUS
Filed April 7, 1930   2 Sheets-Sheet 2
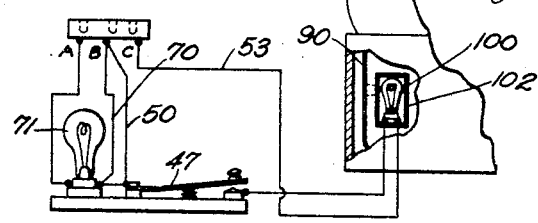
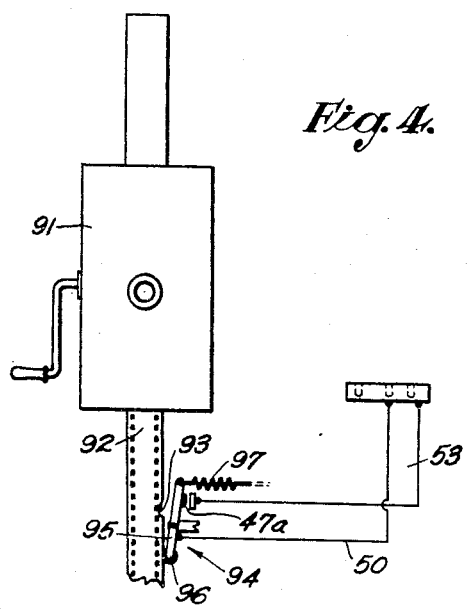
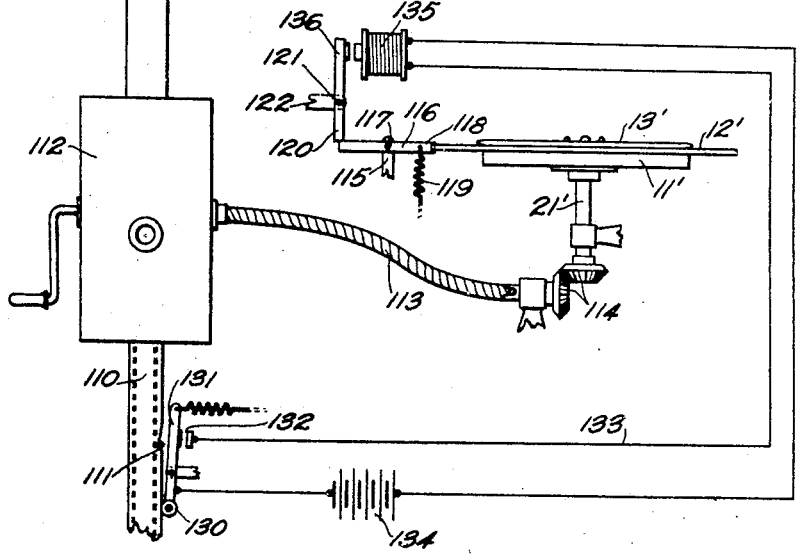
INVENTOR:
VINCENT C. DE YBARRONDO,
BY
ATTORNEY.

Patented Sept. 11, 1934

1,973,400

UNITED STATES PATENT OFFICE 1,973,400

TALKING MOTION PICTURE APPARATUS

Vincent C. de Ybarrondo, Los Angeles, Calif., assignor to Patco, Inc., Los Angeles, Calif., a corporation of California Application April 7, 1930, Serial No. 442,129

11 Claims. (Cl. 88—16.2)

My invention relates to the art of producing motion pictures and relates particularly to that phase of the art in which sound to accompany the picture is recorded on a record which is separate from the film or directly on the film on which the picture is recorded.

The chief object of the invention is to provide a means for synchronizing the sound apparatus with the projecting apparatus. In the present Vitaphone system this is done by setting the projecting apparatus and the sound reproducing apparatus at an initial starting point and then accelerating them to full speed. The rapid acceleration of the film frequently causes it to be torn in two, and further, does not always result in the sound reproducing apparatus being synchronized with the projecting apparatus. The present invention has for a secondary object a means for synchronizing the sound reproducing and the projecting apparatus, in which the projecting apparatus is initially started and brought up to speed and the sound reproducing apparatus is then synchronized instantaneously with the projecting apparatus.

The invention also has for an object the provision of a means for stopping the operation of the sound reproducing apparatus after it has operated for a predetermined length of time. This is made use of in certain pictures where the characters talk only during parts of the scene and in which it is desirable to stop the operation of the sound reproducing apparatus during the silent periods so as to conserve the record.

Further objects and advantages of the invention will be made evident throughout the following part of the specification.

Referring to the drawings which are for illustrative purposes only,

Fig. 3 is a fragmentary diagrammatic view showing an alternative form of film marking mechanism.

Fig. 4 is a diagrammatic view showing how the invention is adapted for projecting and reproducing by substituting for the camera unit of Fig. 1 a projector unit.

Fig. 5 shows a principal feature of my invention applied to the synchronous starting of a continuously operating sound record.

Figure 1:
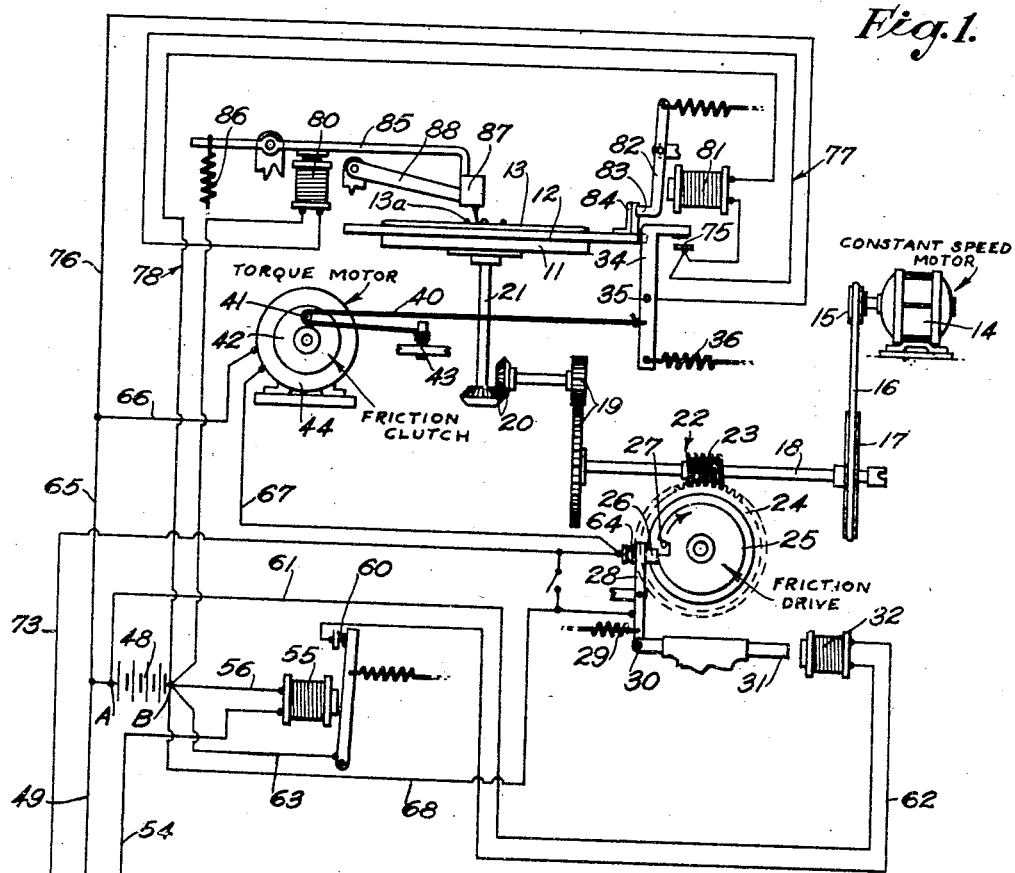
Fig. 1 is a view, diagrammatic in character, showing an embodiment of my invention adapted for recording.

The form of my invention shown in Fig. 1 includes a turntable 11 adapted to receive a disc 12 of light material, such as aluminum, and on which a sound record 13 is placed and caused to rotate by pins 13a which project upwardly from the disc 12. For driving the turntable 11 I provide a constant speed motor 14 having a pulley 15 for transmitting power through a belt 16 to a pulley 17 mounted on a shaft 18. From the shaft 18 the power is transmitted through a gear system including spur gears 19 and bevel gears 20 to a vertical shaft 21 which supports and rotates the turntable 11. A timing device 22 of the invention includes a worm gear 23 adapted to drive a worm wheel 24 and has frictional driving engagement with a timing plate 25 so that the timing plate will rotate with the worm wheel 24 unless held stationary by engagement of a dog 26 with a notch 27 formed therein, in the manner shown. The dog 26 is on a circuit sustaining switch lever 28 which is normally rotated in clockwise direction by a spring 29 and is connected at 30 to an armature 31 adapted to be attracted by a magnet 32. The disc 12, shown in Figs. 1 and 2, rests upon the turntable 11, and by operation of friction between the table 11 and the disc 12, or by other suitable means, the table 11 will rotate the disc 12 unless such disc is held in stationary position by engagement of a stop lever 34, which stop lever may be hinged on a pivot 35 and may be normally rotated in operative or anti-clockwise direction by a spring 36. A lug 38 projecting from the disc 12 is engaged by the lever 34 so that the disc 12 and the record placed thereon cannot be rotated in clockwise direction. When the lever 34 is rotated in clockwise direction, it moves out of engagement with the dog 38 and permits the disc 12 and the record 13 to rotate with and at the same speed as the turntable 11, the starting of the rotation of the disc 12 being substantially instantaneous. For the purpose of rotating the lever 34 in clockwise direction a cord or cable 40 is extended over a pin 41 mounted on a friction disc 42, the lower end of the cable 40 being carried back to a stationary point of attachment, as indicated at 43.

When a torque motor 44 is energized so as to rotate in anti-clockwise direction, frictional engagement of the rotating part of the motor 44 will cause the friction plate 42 to rotate a limited distance so as to exert a pull on the cable 40, with the result of rotating the lever 34 in clockwise direction whereby to cause the lever 34 to disengage the dog 38. In some adaptations of my invention a solenoid or other mechanical device may be employed to move the lever 34 into a position of non-engagement.

The operation of the above described mechanism and the character and operation of the remaining parts of the invention will be clearly evident from the following description. Assuming that the turntable 11 is being driven at constant speed from the motor 14 and that a camera 45 is being operated at a proportionate rate of speed by some suitable means, such as a constant speed motor, which may be located in a cabinet 46 mounted on the camera 45, the closing of a control switch 47 will result in closing an initiating circuit so that from the terminal A of a battery 48 electric current will flow through a conductor 49, a conductor 50, the switch 47, a conductor 51, a magnet 52, a conductor 53, a conductor 54, a magnet 55, and a conductor 56, with the result that the magnet 52 will move a shutter 57 in leftward direction so as to disclose a small light hole 58, and with the result that the magnet 55 will close a switch 60. The closing of this switch 60 permits current to flow from the terminal A of the battery 48 through a conductor 61, the magnet 32, a conductor 62, the switch 60, and a conductor 63 which leads to the terminal B of the battery 48, thus energizing the magnet 32 and causing it to attract the armature 31 so that the lever 28 will be rotated in anti-clockwise direction to lift the dog 26 from engagement with the notch 27 in the timing plate 25, and also to close a switch 64. The closing of the switch 64 permits current to flow from the battery terminal A through a conductor 65, a conductor 66, the windings of the motor 44, a conductor 67, the switch 64, the lever 28, and a conductor 68 which connects the lever 28 with the battery terminal B. The closing of the switch 64 also results in a flow of current from the battery terminal A through the conductor 49, a conductor 70, an indicating light 71, a conductor 72, a conductor 73, the switch 64, the lever 28, and the conductor 68. Therefore, the anti-clockwise movement of the lever 28 accomplishes three things: first, release of the timing disc 25 so that it may rotate with the worm wheel 24; second, energization of the motor 44 so that it will rotate in anti-clockwise direction; and, third, the lighting of the indicator light 71.

Figure 2:
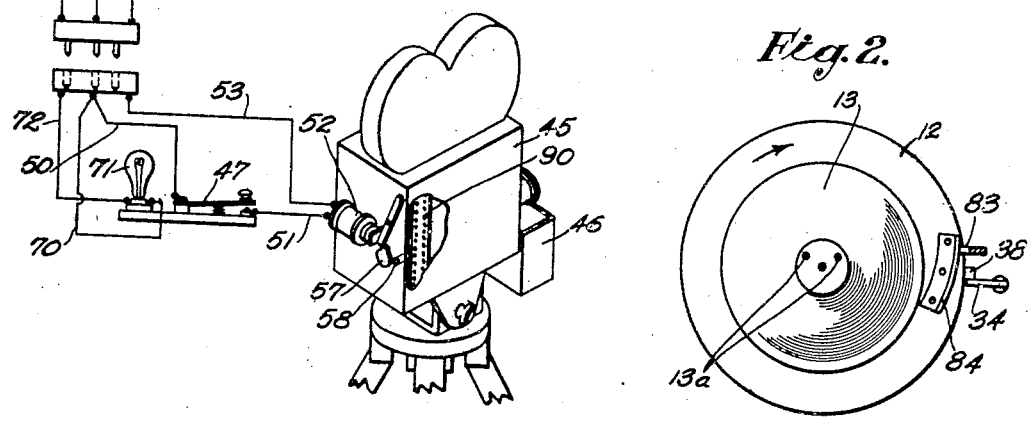
Fig. 2 is a plan view of the record holding disc.

As previously explained herein, energization of the motor 44 operates through the cable 40 to rotate the lever 34 in clockwise direction so as to remove the lever 34 from engagement with the dog 38 of the disc 12. This movement of the lever 34 also closes a switch 75 and permits electric current to flow from the battery contact A through the conductor 65, a conductor 76, a portion of the lever 34, the switch 75, and through conductors 77 and 78 which respectively include magnets 80 and 81, and return to the terminal B of the battery 48. The energization of the magnet 81 moves a brake 82 to a position of nonengagement so that during the time the disc 12 is being rotated by the turntable 11, the lower end or brake portion proper 83 of the brake member 82 will not engage an upwardly projecting spiral cooperative brake plate 84 mounted near the periphery of the disc 12, as shown in Figs. 1 and 2. The energization of the magnet 80 pulls downwardly on a pressure lever 85 which is normally elevated by a spring 86. This pressure lever 85 bears on the top of a sound recorder 87 mounted on a hinged arm 88 and holds the sound recorder firmly in the groove of the record 13.

To start the operation of the sound recording mechanism, the switch 47 need be closed for only a very short period of time, for the operation of the remaining parts of the mechanism is maintained by reason of the timing disc 25 holding the lever 28 in outward position so as to keep the switch 64 closed. The gears 19, 20, 23, and 24 may be proportioned so that the disc 12 and the record 13 will rotate a selected number of revolutions, such as twelve, during the time of a single revolution of the timing plate 25. Therefore, in accordance with the scheme of operation of the device, the record will rotate twelve revolutions and then will be stopped by reason of the notch 27 of the timing disc 25 moving into a position coinciding with the dog 26 of the lever 28 and thus permitting the lever 28 to move in clockwise direction and to open the switch 64. The opening of the switch 64 results in the stopping of the motor 44, extinguishing of the light 71, moving of the lever 34 into a position for engagement of the dog 38 of the disc 12, and releasing of the brake member 82 so that the lower portion 83 thereof will swing leftwardly into such position that it will engage the spiral cooperating brake plate and retard the speed of the disc 12 before the dog 38 strikes the lever 34. The recording mechanism will then remain inoperative until it is again desired to record conversation or other sound, whereupon the switch 47 may be closed, in the manner previously described, so as to start a new cycle of operation of the sound recording equipment. The indicator light 71 indicates to the operator whether the recording equipment is operating or inoperative. The movement of the shutter 57 by the magnet 52 when the switch 47 is closed permits light to enter the light aperture 58 of the camera 45 simultaneously with the closing of the switch 47. The beam of light which passes through the opening 58 strikes the edge of a film 90 within the camera 45, thus making on the edge of such film a mark indicating the point in the film at which the sound apparatus has been started and at which the sound reproducing apparatus of the invention is to be started when the motion picture recorded on the film is projected.

In Fig. 4 I show a motion picture projector 91 through which a positive 92 taken from the film 90 of Fig. 1 is passing. This film 92 has notches 93 cut in the edge thereof at points coinciding with the markings made on the edge of the negative film 90 by the passage of light through the aperture 58 of the camera 45. For the purpose of projecting the film, the projector 91 is substituted for the camera 45 in the arrangement of parts shown in Fig. 1, and the recorder 87 is replaced by a reproducer of a sound reproducing apparatus. A control switch device 94 is placed so as to be operated by the notches 93 in the edge of the positive film 92, a simple form of control switch 94 consisting of a lever 95 having a roller 96 adapted to engage the edge of the film 92. When the roller 96 drops into a notch 93, the upper end of the lever 95 will be swung in rightward direction by a spring 97, thus closing a switch 47a which is incorporated between the ends of the conductors 50 and 53. From the description of the operation of the switch 47 in Fig. 1 and its cooperative parts, it will be recognized that when the conductors 50 and 53 are connected, the sound apparatus will be instantaneously started, all as previously described. In the projecting of the motion picture recorded on the positive film 92 of Fig. 4, the sound apparatus will remain inoperative until actuation of the switch mechanism 94 due to the passing of a notch 93. Then the sound apparatus will be instantaneously started and will operate in synchronism with the action of the film 92 until such sound apparatus is automatically stopped by the timing disc 25. It will then remain inoperative until another controlling notch formed in the edge of the film causes it to pass through another cycle of operation in synchronism with the portion of the film 92 following the notch which energizes such cycle of operation.

In Fig. 3 I show an alternative form of marking the film for the purpose of indicating the points of starting of the sound apparatus. In this alternative form, the shutter 57 and the opening 58 of Fig. 1 are replaced by a light 100 situated in a light-proof housing 102, this housing having a small opening adjacent to the film 90 so that when the switch 47 is closed, a beam of light will be cast from the lamp 100 onto the edge of the film 90.

In Fig. 5 I show an important element or feature of my invention especially adapted for use with the present Vitaphone system of sound motion picture reproduction. In this Vitaphone system it is customary to set both the record and the film at a starting point and then accelerate them both to full operating speed. The rapid acceleration to which the film is subjected often causes breakage at the starting end thereof and ensuing difficulties in properly repairing the film. My invention provides a film 110 with a notch or other indicating means 111 for denoting the point at which a record 13' carried by a disc 12' shall be started in order to operate in synchronism with the film 110. The disc 12' is mounted on a turntable 11' supported by a vertical shaft 21' adapted to be rotated in synchronism with the mechanism of a projector 112 by means of a flexible drive shaft 113 and gears 114. To a support 115 a stop lever 116 is pivoted, as indicated at 117. The rightward end 118 of this stop lever 116 is normally urged downwardly by a spring 119 but is held in engagement with the edge of the disc 12' by a latch lever 120 pivoted at 121 to a stationary post 122. In the operation of this embodiment of the invention the film 110 may be started slowly and accelerated at a reasonable rate to its full operating speed. During this start and acceleration of the film 110, the plate 12' and the record 13' are held stationary by the trigger 116. When the indicating notch 111 in the edge of the film 110 coincides with the roller 130, the lever 131 which supports the roller is allowed to swing in clockwise direction so as to close a switch 132 and to close an electric circuit 133 which includes a battery 134 and a magnet 135 for attracting the upper end 136 of the latch 120 in rightward direction. When the latch 120 is actuated by the magnet 135, the lower end thereof will be disengaged from the leftward end of the trigger 116, thus permitting the spring 119 to pull the rightward end 118 of the trigger 116 downwardly and out of engagement with the disc 12', thereby enabling the disc 12' and the record 13' to instantaneously assume the rotation of the turntable 11' in synchronism with the film 110 which is moving through the projector 112. By the use of this embodiment of the invention in the Vitaphone type of equipment, many of the difficulties of synchronization may be eliminated.

Although I have herein shown and described a simple and practical embodiment of my invention, it is recognized that certain parts or elements thereof are representative of other parts, elements, or mechanisms which may be employed in substantially the same manner to accomplish substantially the same results; therefore, it is to be understood that the invention is not to be limited to the details disclosed herein but shall have the scope of the following claims.

I claim as my invention:

1. In combination: a rotating turntable; a record resting upon and frictionally drivable by said turntable; holding means for preventing rotation of said record, said holding means comprising a shouldered member connected to said record and a stationary member adapted to engage the shoulder of said shouldered member; a moving film; and means for releasing said holding means when a certain portion of said film passes a given point.

2. In combination: a rotating turntable; a record resting upon and frictionally drivable by said turntable; holding means for preventing rotation of said record, said holding means comprising a shouldered member connected to said record and a stationary member adapted to engage the shoulder of said shouldered member; a moving film; means for releasing said holding means when a certain portion of said film passes a given point; and means for operating said holding means to stop rotation of said record after a predetermined amount of said film has passed by said given point.

3. In combination: a rotating turntable; a record resting upon and frictionally drivable by said turntable; holding means for preventing rotation of said record, said holding means comprising a shouldered member connected to said record and a stationary member adapted to engage the shoulder of said shouldered member; a moving film providing an indentation therein; and means operated by said indentation for releasing said holding means when a certain portion of said film passes a given point.

4. In combination: a rotating turntable; a record resting upon and frictionally drivable by said turntable; holding means for preventing rotation of said record, said holding means comprising a shouldered member connected to said record and a stationary member adapted to engage the shoulder of said shouldered member; a moving film providing an indentation therein; roller means engaging said film, said roller means being operated when it engages said indentation; and means actuated by the operation of said roller means for releasing said holding means.

5. A device of the character described, including: a film handling device; means for moving a film through said film handling device; a record; a support for said record; a record driving member adapted to frictionally engage said support so as to continuously tend to rotate said record; means for moving said driving member in synchrony with said film; a stop engaging a fixed shoulder on said support; and means operated by said film for releasing said stop so as to permit movement of said support by said driving member.

6. A device of the character described, including: a motion picture film having consecutive markings therealong; means for moving said film; a sound producing system; means for starting the operation of said sound producing system each time one of said markings passes a given point; a chronometric device; and means operated by said chronometric device for stopping said sound producing system at a predetermined time after each start thereof by said starting means.

7. A device of the character described, including: a motion picture film having consecutive markings therealong; means for moving said film; a sound record; means for consecutively actuating said sound record, such actuating means being controlled by said consecutive markings of said film; and a timing device automatically operating to stop said record at a predetermined time after each start thereof by said actuating means under control of said markings.

8. A sound motion picture device of the character described, including: a moving member having control elements consecutively placed thereon to indicate the starting points of sound to accompany a motion picture being exhibited; a sound producing system; means for starting said sound producing system each time one of said control elements passes a given point; and a timing device operative to stop said sound producing system at a prescribed lapse of time after each start thereof by said starting means under control of said control elements.

9. A sound motion picture device of the character described, including: a moving member having control elements consecutively placed thereon to indicate the starting points of sound to accompany a motion picture being exhibited; a sound producing system; and control means for said sound producing system comprising a rotary driving member, a driven member connected to said driving member so as to be frictionally driven thereby, said driven member having a stop shoulder, an engager for engaging said shoulder to prevent rotation of said driven member, means for lifting said engager from engagement with said shoulder each time one of said control elements passes a given point so as to permit said driven member to rotate until said engager again engages said shoulder to stop said driven member, and means for causing operation of said sound producing system during the time said driven member is rotating.

10. A sound motion picture device of the character described, including: a moving member having control elements consecutively placed thereon to indicate the starting points of sound to accompany a motion picture being exhibited; a sound producing system including a record, means for applying a driving force to said record, stop means operative to prevent movement of said record by said driving force, and means for moving said stop means into a non-engaging position relative to said record; and control means for said sound producing system comprising a rotary driving member, a driven member connected to said driving member so as to be frictionally driven thereby, said driven member having a stop shoulder, an engager for engaging said shoulder to prevent rotation of said driven member, means for lifting said engager from engagement with said shoulder each time one of said control elements passes a given point so as to permit said driven member to rotate until said engager again engages said shoulder to stop said driven member, and means for causing movement of said stop means into said non-engaging position during the time said driven member is rotating.

11. A sound motion picture device of the character described, including: a moving member having control elements consecutively placed thereon to indicate the starting points of sound to accompany a motion picture being exhibited; a sound producing system including a record, means for applying a driving force to said record, stop means operative to prevent movement of said record by said driving force, and means for moving said stop means into a non-engaging position relative to said record; control means for said sound producing system comprising a rotary driving member, a driven member connected to said driving member so as to be frictionally driven thereby, said driven member having a stop shoulder, an engager for engaging said shoulder to prevent rotation of said driven member, means for lifting said engager from engagement with said shoulder each time one of said control elements passes a given point so as to permit said driven member to rotate until said engager again engages said shoulder to stop said driven member, and means for causing movement of said stop means into said non-engaging position during the time said driven member is rotating; a brake engaging said record to retard the movement thereof; and means for holding said brake in inoperative condition when said stop means is in non-engaging position.

VINCENT C. de YBARRONDO.